(12) United States Patent
Grieskamp et al.

(10) Patent No.: US 7,088,864 B2
(45) Date of Patent: Aug. 8, 2006

(54) GENERATING A TEST SUITE FROM AN ABSTRACT STATE MACHINE

(75) Inventors: Wolfgang Grieskamp, Seattle, WA (US); Yuri Gurevich, Redmond, WA (US); Wolfram Schulte, Bellevue, WA (US); Margus Veanes, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1116 days.

(21) Appl. No.: 10/071,524

(22) Filed: Feb. 8, 2002

(65) Prior Publication Data

US 2003/0159087 A1 Aug. 21, 2003

(51) Int. Cl.
*G06K 9/36* (2006.01)
*G06K 9/46* (2006.01)

(52) U.S. Cl. .................................... 382/232

(58) Field of Classification Search ............... 382/100, 382/173, 232, 233, 239, 243; 345/643; 375/130, 375/147, 222; 703/21–22; 707/3; 708/653; 709/200, 230; 710/309; 717/125, 147
See application file for complete search history.

(56) References Cited

U.S. PATENT DOCUMENTS

| | | | |
|---|---|---|---|
| 6,212,566 B1* | 4/2001 | Vanhoof et al. | 709/230 |
| 6,560,270 B1* | 5/2003 | Hischke | 375/136 |
| 6,597,727 B1* | 7/2003 | Philips et al. | 375/147 |
| 6,708,327 B1* | 3/2004 | Aliphas | 717/125 |
| 2002/0067757 A1* | 6/2002 | Philips et al. | 375/130 |
| 2003/0159087 A1* | 8/2003 | Grieskamp et al. | 714/37 |
| 2003/0191797 A1* | 10/2003 | Gurevich et al. | 709/200 |

OTHER PUBLICATIONS

Grieskamp, W., "Generating Finite State Machines from Abstract State Machines," Technical Report MSR-TR-2001-97, Microsoft Research, Revised May 2002, pp. 1-19.

* cited by examiner

*Primary Examiner*—Amir Alavi
(74) *Attorney, Agent, or Firm*—Klarquist Sparkman, LLP (57) ABSTRACT

A method and apparatus to generate a test suite from an abstract state machine (ASM) involves generating a finite state machine (FSM) for the ASM, and generating the test suite from the FSM. An initial state of the ASM is selected. A first encoding having a plurality of bits is generated to represent the initial state. Each bit of the first encoding represents a result of an evaluation of a non-trivial guard condition of the ASM. The initial state is associated with the first encoding in the data structure for the FSM. At least one other states of the ASM are identified that result from applying at least one actions of the ASM to the initial state. At least one other encodings are generated, each of the at least one other encodings corresponding to one of the at least one other states, and for each one of the at least one other states, when the corresponding of the at least one other encodings is not the same as the any one encoding already associated with a state in the data structure, data is included in the data structure associating the one of the at least one other states and a corresponding of the at least one other encodings.

23 Claims, 6 Drawing Sheets

```
Open() = if not open then
            open:=true
Close() = if open and counter<Max then
            open:=false
            counter:=counter+1
        if open and counter=Max then
            open:=false
            counter:=0
SetMax() = if true then
            counter:=Max
```

GENERATING A TEST SUITE FROM AN ABSTRACT STATE MACHINE

TECHNICAL FIELD

The invention relates to the generation of test suites, and more particularly to the generation of test suites from abstract state machines.

BACKGROUND

The behavior and operation of devices may be described using abstract state machines (ASMs). For each action that the device may taken, the ASM defines conditions that must be met to effect changes to the state of the device. The conditions may be said to "guard" changes to the device state, and may thus be referred to as guards on the device state. In a normalized form, state settings, for each action that the device may take are guarded by simple (e.g. non-nested) conditions. For a more complete description of normalized ASMs, see Y. Gurevich, *Evolving Algebra*, 1993: *Lipari Guide*, and In Egon Boerger, *Specification and Validation Methods*, pages 9–36, Oxford University Press, 1995. ASMs have applications beyond describing the behavior and operation of devices. For example, ASMs may describe the behavior and operation of software programs executing on a general purpose computer system.

Each unique combination of state settings represents a state of the device in the ASM. For this reason, ASMs may have a large, even infinite number of states. For example, consider a simple device comprising a door that can be opened and closed. The device may include a counter which tracks the number of times the door has been closed. The counter is a state setting. An ASM for the device has an infinite number of states, one for each potential value of the counter.

Well known techniques exist for generating test suites from finite state machines (FSMs), e.g. state machines with a finite number of states. FSMs define the behavior of a device in terms of device states and the events that result in state changes.

Due to the very large or infinite number of states of the ASMs, it is often impractical to apply to ASMs the techniques for generating test suites from FSMs. A need exists for a manner of producing an FSM from an ASM, which would lead to the application of FSM test suite generation techniques to ASMs.

SUMMARY

In one aspect, an FSM is generated from an ASM by first selecting an initial state of the ASM. A first encoding having a plurality of bits is generated to represent the initial state. Each bit of the first encoding represents a result of an evaluation of a non-trivial guard condition of the ASM. The initial state is associated with the first encoding in the data structure for the FSM. At least one other states of the ASM are identified that result from applying at least one actions of the ASM to the initial state. At least one other encodings are generated, each of the at least one other encodings corresponding to one of the at least one other states, and for each one of the at least one other states, when the corresponding of the at least one other encodings is not the same as the any one encoding already associated with a state in the data structure, data is included in the data structure associating the one of the at least one other states and a corresponding of the at least one other encodings.

DESCRIPTION

In the following figures and description, like numbers refer to like elements. References to "one embodiment" or "an embodiment" do not necessarily refer to the same embodiment, although they may. Although the following description is made in terms of specifying the behavior and operation of devices, the methods herein may be applied to numerous applications, including specifying the behavior and operation of software.

Figure 1:
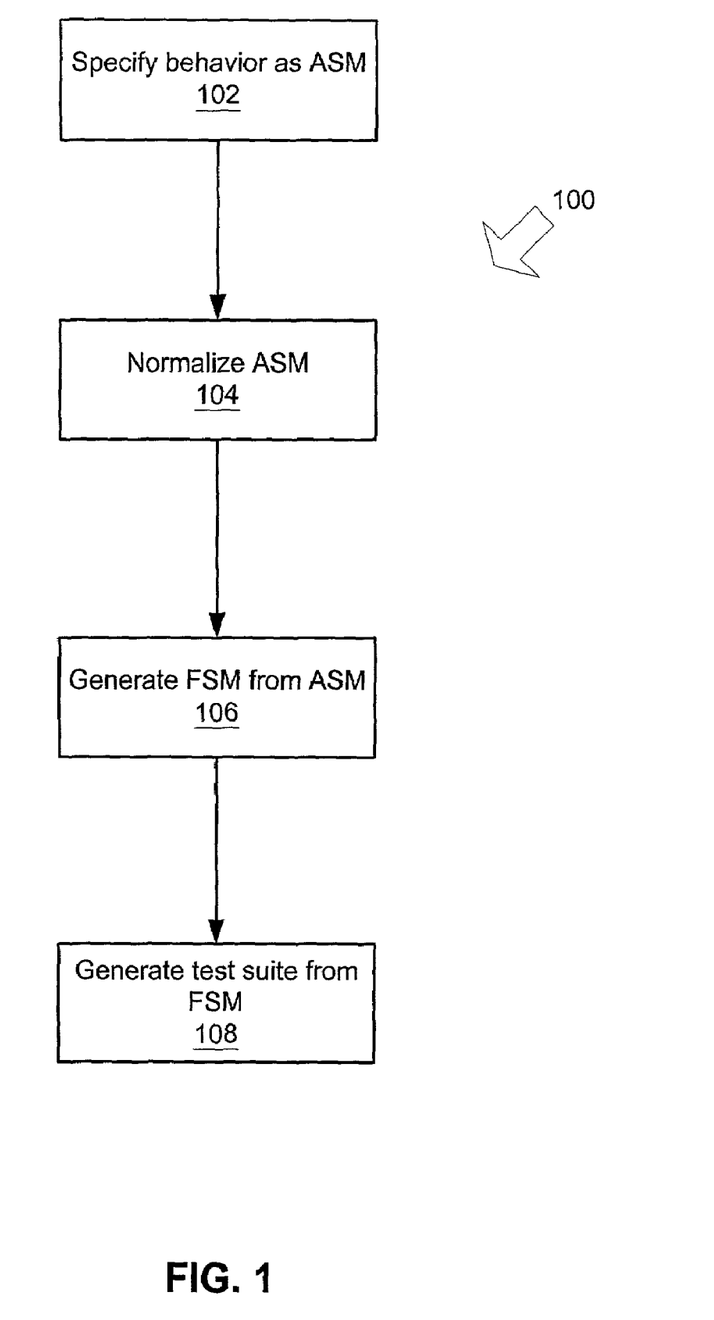
FIG. 1 is a flow chart of an embodiment of a method to generate a test suite from an ASM.

With reference to FIG. 1, an embodiment 100 of a method to generate a test suite begins by specifying at 102 a behavior by way of an ASM. In one embodiment, the behavior to specify may be that of a device that couples to a computer system executing the Microsoft™ Windows™ operating system. For example, the device may be a "smart" video cassette recorder (VCR), digital versatile disk (DVD) player, stereo system, or other home entertainment device that may be controlled by way of a personal computer. The ASM for the device specifies how the device should update its state in response to actions performed on or by the device. For example, consider a DVD player with a door to receive DVDs. When the door is open, the state of the device is "open". In this state, the DVD player should respond to "close" actions by closing the door and updating its state to "closed". The device should also update a counter to track a number of times the door has been closed. When this counter reaches a predetermined threshold value, the device or the computer to which it is coupled may indicate that service is due to be performed on the door.

At 104 the ASM for the device is normalized. Normalizing the ASM involves organizing the ASM into the form:

action 1
   if guard1 then rule1
   if guard2 then rule2
   ...
action 2
   if guard3 then rule3
   if guard4 then rule4
   ...
...

In this form, each 'action' (action 1, action 2) represents an action within the behavior to specify. In this form, 'rules' (e.g. rule 1, rule 2, etc.) are updates to state variables that take place when the corresponding guard condition is satisfied. Each guard condition is 'simple', e.g. non-nested. A nested guard condition is a condition within a condition. For example, during normalization the nested condition    if open then if (counter<Max) then counter:
      =counter+1 may be replaced with if (open and counter<Max) then counter:=counter+1.

Once normalized, changes to the state settings of the device are guarded by simple (e.g. non-nested) conditions. At 106, an FSM is generated from the normalized ASM, and at 108 a test suite is generated from the FSM.

Figure 2:
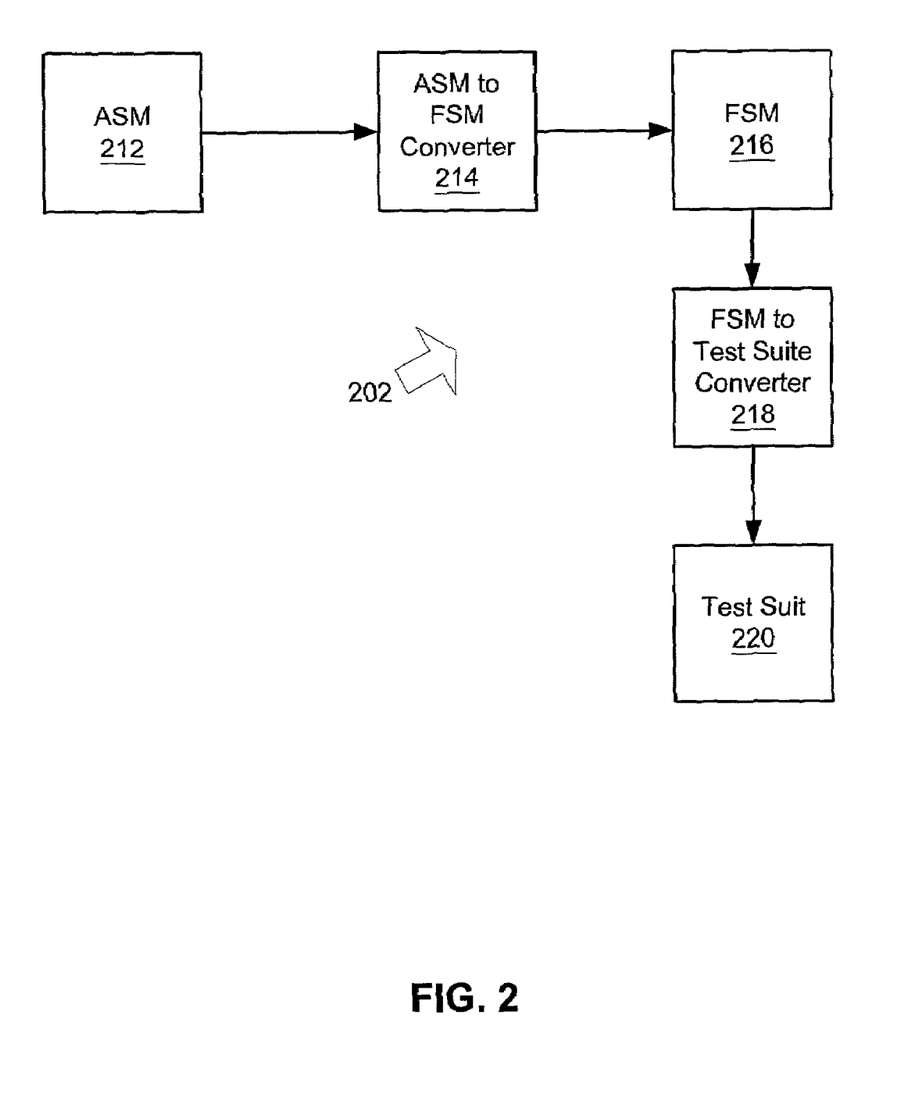
FIG. 2 is a block diagram of an embodiment of a system to generate a test suite from an ASM.

With reference to FIG. 2, an embodiment 202 of a system comprises an ASM data structure 212 that is provided to an ASM-to-FSM converter 214. The ASM-to-FSM converter 214 may be embodied as instructions and data (e.g. software) executing on a general purpose computer processor. Other embodiments may comprise instructions and/or operations embodied in combinations of software and hardware circuits. The ASM-to-FSM converter 214 produces an FSM 216 from the ASM 212. The FSM 216 is applied to an FSM-to-Test-Suite converter 218. The FSM-to-Test-Suite converter 218 may be embodied as instructions and data (e.g. software) executing on a general purpose computer processor. Other embodiments may comprise instructions and/or operations embodied in combination of software and hardware circuits. The FSM-to-Test-Suite converter 218 produces a test suite 220 from the FSM 216.

Figure 3:
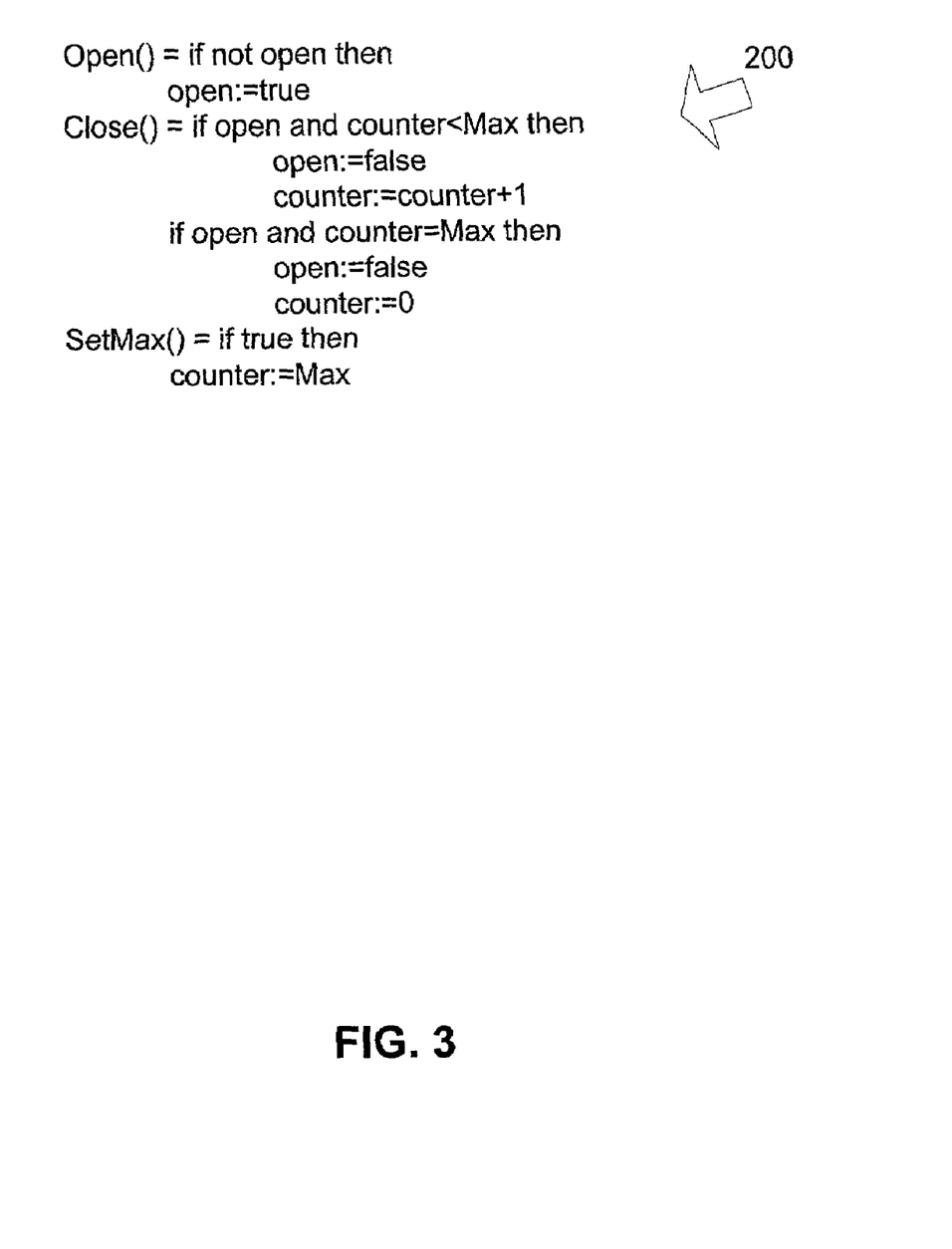
FIG. 3 is a code listing of an embodiment of a normalized ASM for a device comprising a door that can open and close.

With reference to FIG. 3, an embodiment 200 of a normalized ASM for an embodiment of a DVD player includes sections for actions that can be performed on the DVD player. These actions include Open to open and Close to close the DVD player, and an action SetMax to set the counter to a predetermined threshold value.

The Open and SetMax actions each have a single guard. The Close action has two guards. In general, an action can have any number of guards. The guard for the Open action is the condition "not open", and it guards the state setting "open:=true". In other words, if an Open action is performed, and the device is not already in the open state, the device is placed into the open state. The first guard for the Close action is the condition "open and counter<Max", and it guards the state settings "open:=false" and "counter:=counter+1". In other words, if a Close action is performed, and the device is open and the close counter is less than the predetermined threshold, the device is set to the closed state and the counter is incremented. The second guard for the Close action is the condition "open and counter=Max", and it guards the state settings "open:=false" and "counter:=0". In other words, if a Close action is performed, and the device is open and the close counter is equal to the predetermined threshold, the device is set to the closed state and the counter is reset to zero. The guard for the SetMax action is the condition "true", and it guards the state setting "counter:=Max". The condition "true" actually specified the unconditional updating of the close counter to the predetermined threshold value Max whenever the SetMax action is performed.

Figure 4:
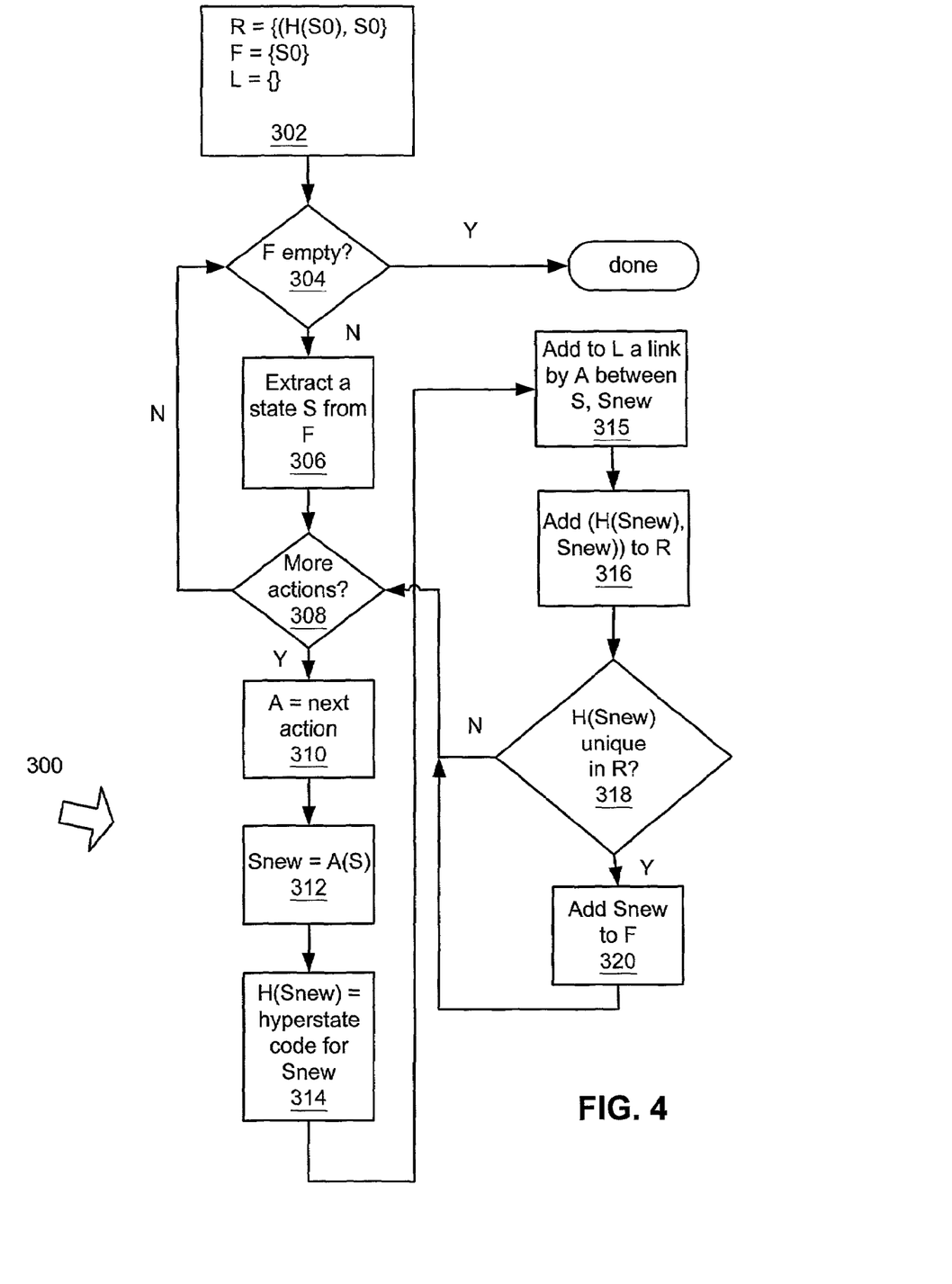
FIG. 4 is a flow chart of an embodiment of a method of generating an FSM from an ASM.

With reference to FIG. 4, and embodiment 300 of a method to generate an FSM from an ASM begins at 302 with initial settings of the sets R, F, and L. The method may be applied to generate a data structure representing the FSM in a computer memory. As used herein, the term 'data structure' refers to any collection of related data. The set R associates an encoding with one of the FSM states, in a manner to be described. Initially, the set R contains an encoding for a selected initial state of the FSM. The encoding is determined as follows. A bit position is assigned to each guard in the ASM. If, in a particular state, a guard condition is satisfied (e.g. evaluates true), the corresponding bit is set. Otherwise the corresponding bit is not set. Consider the ASM embodiment of FIG. 2. The guards are:

1. not open
2. open and counter<Max
3. open and counter=Max
4. true

In one embodiment, guard 1 may be assigned to bit position b0. Guard 2 may be assigned to bit position b1, guard 3 may be assigned to bit position b2, and guard 4 may be assigned to bit position b3. Note that guard 4 is always true and so b3 is set for all encodings. Such a guard may be referred to as a "trivial" guard condition. The bit b3 of this trivial guard condition does nothing to distinguish one encoding from another and may be omitted from the encoding. The distinct encodings are:

| | | |
|---|---|---|
| 000 | guards 1, 2, 3 false | impossible-the door can't be both open and closed |
| 001 | guard 1 true, guards 2 and 3 false | possible |
| 010 | guard 2 true, guards 1 and 3 false | possible |
| 011 | guards 1 and 2 true, guard 3 false | impossible-the door can't be both open and closed |
| 100 | guard 3 true, guards 1 and 2 false | possible |
| 101 | guards 1 and 3 true, guard 2 false | impossible-the door can't be both open and closed |
| 110 | guards 2 and 3 true, guard 1 false | impossible-the counter can't be both <Max and = Max |
| 111 | guards 1, 2, and 3 true | impossible-the door can't be both open and closed |

Of the eight distinct encodings, only three are possible. One state is selected as an initial state—for example, the state corresponding to encoding 001. This state (the "state" being determined by the values of the variables "open" and "counter") is initially associated with the encoding 001 in the set R. The set F comprises the set of all states to be operated upon by the method 300; this set will grow and shrink as the method proceeds. Initially, F comprises only the initial starting state of the FSM. The set L comprises links between states of the FSM. A link is an action and a pair of states, where the action causes a change from one state of the pair to the other. Initially, the link set L is empty.

If it is determined at 304 that the set F is empty, there are no more states to process and the method 300 concludes. Otherwise a next state S to process is extracted from the set F at 306. Next, every action of the ASM is applied to the state S to cause transitions to other states. If all such actions have been applied at 308, processing returns to 304. Otherwise, a next action to apply to S is selected at 310. The action is applied at 312 and results in a state Snew. An encoding for the state Snew is produced at 314 and a link between the states S and Snew is added to L at 315. At 316 the encoding is associated with Snew in R. If at 318 the encoding is unique in R, e.g. not matching the encoding associated with an existing state of the FSM, Snew is added at 320 to the set of states F to operate upon. Otherwise, Snew is not added to F and the method returns to 308.

Figure 5:
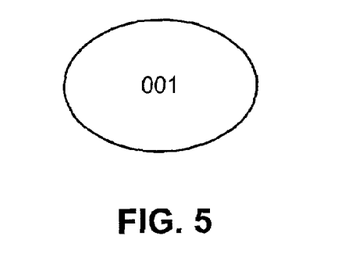
FIGS. 5–7 are state diagrams of the FSM produced after various iterations of the method of FIG. 4.
Figure 6:
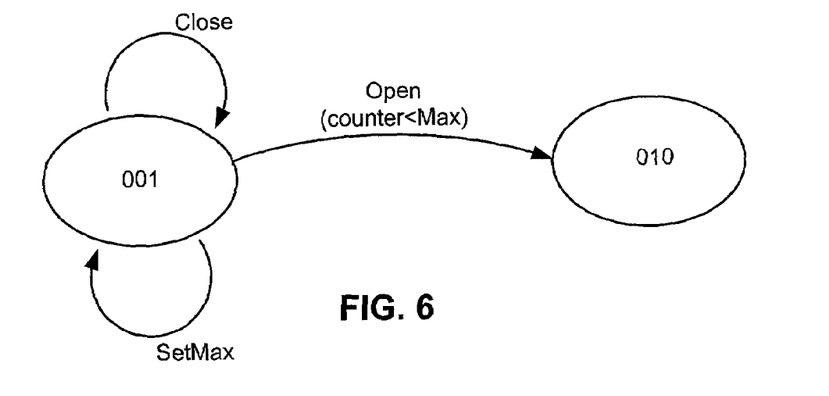
Figure 7:
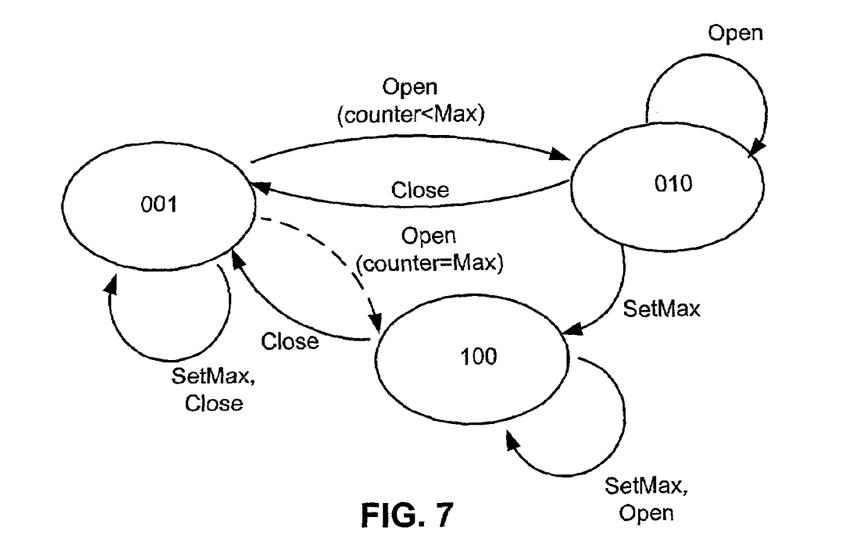

With reference to FIGS. 5–7, state transition diagrams illustrate the generation of an FSM as the method embodiment 300 is applied to the normalized ASM embodiment 200 of FIG. 2. With reference to FIG. 5, initially the FSM comprises only an initial state having the encoding 001, with no links. With reference to FIG. 6, after a first iteration of the method 300, the FSM comprises two states with encodings of 001 and 010. The FSM now includes links for each action the device may take—Open, Close, and SetMax. The Close and SetMax actions do not cause a state change; however, the Open action causes a state change from 001 to 010 when the counter is less than the value Max.

With reference to FIG. 7, at the conclusion of the method 300, the FSM comprises a third state with the encoding 100 and additional links. Note the dotted line labeled "Open" between the states 001 and 100. This is a link that is not generated by the method 300 except is situations where the value Max is small. This link represents a transition between the states which occurs when the device is in state 001, with the counter set to Max, and an Open action is performed. Thus the FSM produced by the method 300 does not always fully specify the behavior of the ASM from which it is generated. It is possible that links, and even entire states, may be omitted from the generated FSM in some circumstances. However, the generated FSM will often be complete, or nearly complete, so that a thorough test suite may be generated from it using known techniques.

Figure 8:
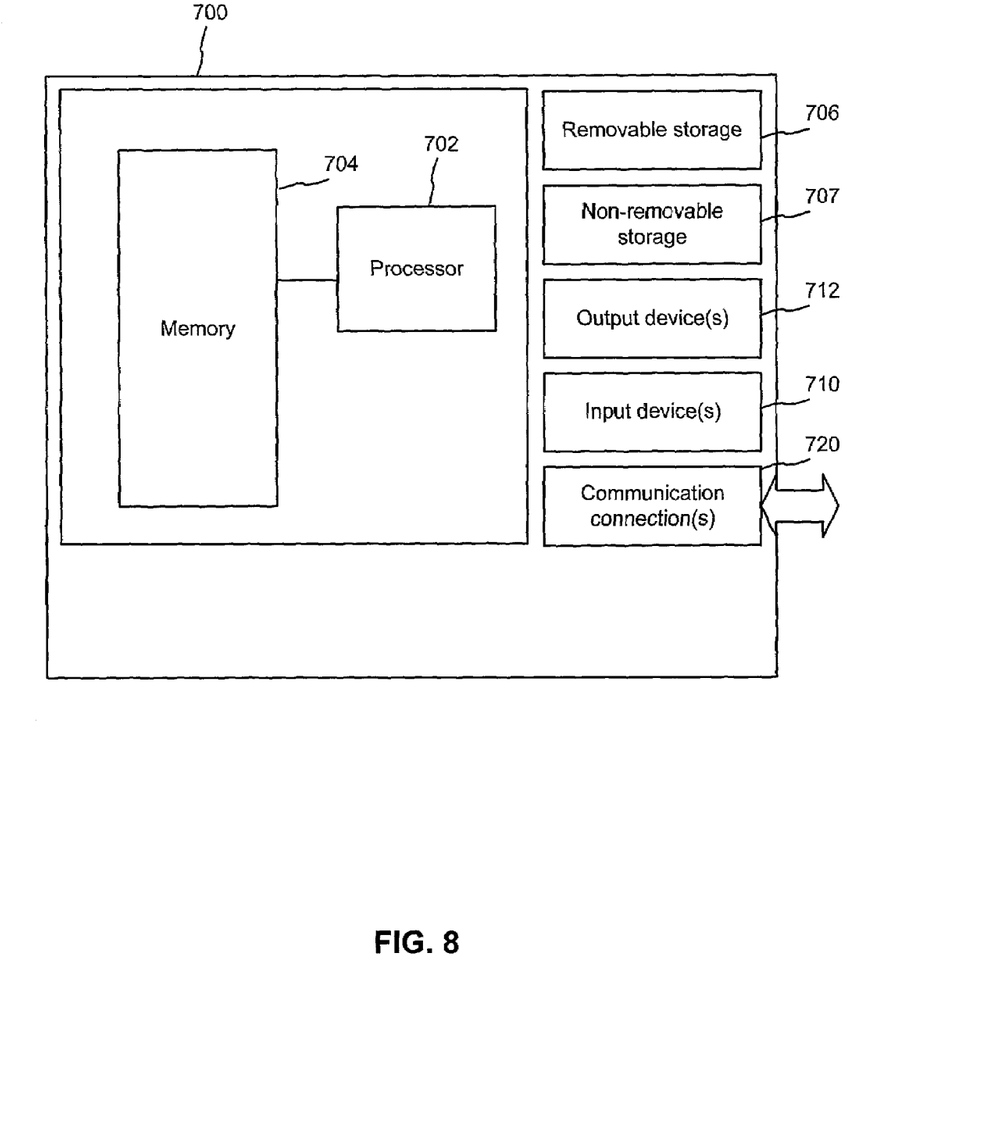
FIG. 8 is a block diagram of a computer system embodiment that may be employed to carry out embodiments of the methods described herein.

With reference to FIG. 8, an apparatus embodiment 700 for practicing embodiments of the present invention comprises a processing unit 702 (e.g., a processor, microprocessor, micro-controller, etc.) and machine-readable media 704. Depending on the configuration and application (mobile, desktop, server, etc.), the memory 704 may be volatile (such as RAM), non-volatile (such as ROM, flash memory, etc.) or some combination of the two. By way of example, and not limitation, the machine readable media 704 may comprise volatile and/or nonvolatile media, removable and/or non-removable media, including: RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information to be accessed by the apparatus 700. The machine readable media 704 may be implemented in any method or technology for storage of information such as computer readable instructions, data structures, program modules or other data. Such instructions and data may, when executed by the processor 702, carry out embodiments of methods in accordance with the present invention.

The apparatus 700 may comprise additional storage (removable 706 and/or non-removable 707) such as magnetic or optical disks or tape. The apparatus 700 may further comprise input devices 710 such as a keyboard, pointing device, microphone, etc., and/or output devices 712 such as display, speaker, and printer. The apparatus 700 may also typically include network connections 720 (such as a network adapter) for coupling to other devices, computers, networks, servers, etc. using either wired or wireless signaling media.

The components of the device may be embodied in a distributed computing system. For example, a terminal device may incorporate input and output devices to present only the user interface, whereas processing component of the system are resident elsewhere. Likewise, processing functionality may be distributed across a plurality of processors.

The apparatus may generate and receive machine readable instructions, data structures, program modules or other data in a modulated data signal such as a carrier wave or other transport mechanism. The term "modulated data signal" means a signal that has one or more of its characteristics set or changed in such a manner as to encode information in the signal. This can include both digital, analog, and optical signals. By way of example, and not limitation, communication media includes wired media such as a wired network or direct-wired connection, and wireless media such as acoustic, RF, infrared and other wireless media. Communications media, including combinations of any of the above, should be understood as within the scope of machine readable media.

In view of the many possible embodiments to which the principles of the present invention may be applied, it should be recognized that the detailed embodiments are illustrative only and should not be taken as limiting in scope. Rather, the present invention encompasses all such embodiments as may come within the scope and spirit of the following claims and equivalents thereto.

What is claimed is:

1. A method of generating a data structure representing a finite state machine (FSM) in a computer memory, the method comprising:
   generating a first encoding corresponding to a first state of an abstract state machine (ASM), the encoding generated from an evaluation of non-trivial guard conditions of the ASM; and
   when the first encoding is not the same as any encoding already associated with a state of the FSM, including data associating the first encoding with the first state in the data structure representing the FSM.

2. The method of claim 1 wherein generating the encoding further comprises:
   evaluating non-trivial guard conditions of the ASM;
   representing the result of each evaluation with a first value in the encoding when the evaluation is true; and
   representing the result of each evaluation with a second value in the encoding otherwise.

3. The method of claim 1 wherein the ASM has a normalized form.

4. The method of claim 1 further comprising:
   performing at least one actions of the ASM on the first state to generate at least one state transitions to at least one other ASM states;
   generating at least one other encodings, each other encoding corresponding to one of the at least one other ASM states; and
   when one of the other encodings is not the same as any one of the encodings already associated with a state of the FSM, including data representing the one of the other encodings and the corresponding state in the data structure representing the FSM.

5. The method of claim 4 further comprising:
   concluding generation of the data structure when each of the at least one other encodings is the same as any one of the encodings already associated with a state of the FSM.

6. A method of generating a data structure representing a finite state machine (FSM) in a computer memory, the method comprising:
   selecting an initial state of an abstract state machine (ASM);
   generating a first encoding comprising a plurality of bits to represent the initial state, each bit of the first encoding representing a result of an evaluation of a non-trivial guard condition of the ASM;
   associating the initial state with the first encoding in the data structure for the FSM;

identifying at least one other states of the ASM that result from applying at least one actions of the ASM to the initial state;

generating at least one other encodings, each of the at least one other encodings corresponding to one of the at least one other states; and for each one of the at least one other states, including data in the data structure associating the one of the at least one other states and a corresponding of the at least one other encodings when the corresponding of the at least one other encodings is not the same as the any one encoding already associated with a state in the data structure.

7. The method of claim 6 further comprising:
including in the data structure data representing an action that results in a transition from the first state to one of the at least one other states.

8. The method of claim 6 wherein the ASM has a normalized form.

9. An article comprising:
a machine-readable medium comprising instructions to generate a data structure representing a finite state machine (FSM) in a computer memory, the instructions, when executed by a computer system, resulting in:

generating a first encoding corresponding to a first state of an abstract state machine (ASM), the encoding generated from an evaluation of non-trivial guard conditions of the ASM; and when the first encoding is not the same as any encoding already associated with a state of the FSM, including data associating the first encoding with the first state in the data structure representing the FSM.

10. The article of claim 9 wherein the instructions, when executed by the computer system, result in:
evaluating non-trivial guard conditions of the ASM;
representing the result of each evaluation with a first value in the encoding when the evaluation is true; and
representing the result of each evaluation with a second value in the encoding otherwise.

11. The article of claim 9 wherein the instructions, when executed by the computer system, operate upon the ASM in a normalized form.

12. The article of claim 9 wherein the instructions, when executed by the computer system, result in:
performing at least one actions of the ASM on the first state to generate at least one state transitions to at least one other ASM states;
generating at least one other encodings, each other encoding corresponding to one of the at least one other ASM states; and
when one of the other encodings is not the same as any one of the encodings already associated with a state of the FSM, including data representing the one of the other encodings and the corresponding state in the data structure representing the FSM.

13. The article of claim 9 wherein the instructions, when executed by the computer system, result in:
concluding generation of the data structure when each of the at least one other encodings is the same as any one of the encodings already associated with a state of the FSM.

14. An article comprising:
a machine-readable medium comprising instructions to generate a data structure representing a finite state machine (FSM) in a computer memory, the instructions, when executed by a computer system, resulting in:

selecting an initial state of an abstract state machine (ASM);

generating a first encoding comprising a plurality of bits to represent the initial state, each bit of the first encoding representing a result of an evaluation of a non-trivial guard condition of the ASM;

associating the initial state with the first encoding in the data structure for the FSM;

identifying at least one other states of the ASM that result from applying at least one actions of the ASM to the initial state;

generating at least one other encodings, each of the at least one other encodings corresponding to one of the at least one other states; and for each one of the at least one other states, including data in the data structure associating the one of the at least one other states and a corresponding of the at least one other encodings when the corresponding of the at least one other encodings is not the same as the any one encoding already associated with a state in the data structure.

15. The article of claim 14 wherein the instructions, when executed by the computer system, result in:
including in the data structure data representing an action that results in a transition from the first state to one of the at least one other states.

16. The article of claim 14 wherein the instructions, when executed by the computer system, operate upon the ASM in a normalized form.

17. An apparatus comprising:
a processor; and
a machine-readable medium comprising instructions to generate a data structure representing a finite state medium (FSM) in a computer memory, the instructions, when executed by a computer system comprising the processor, resulting in:

generating a first encoding corresponding to a first state of an abstract state machine (ASM), the encoding generated from an evaluation of non-trivial guard conditions of the ASM; and when the first encoding is not the same as any encoding already associated with a state of the FSM, including data associating the first encoding with the first state in the data structure representing the FSM.

18. The apparatus of claim 17 wherein the instructions, when executed by the computer system, result in:
evaluating non-trivial guard conditions of the ASM;
representing the result of each evaluation with a first value in the encoding when the evaluation is true; and
representing the result of each evaluation with a second value in the encoding otherwise.

19. The apparatus of claim 17 wherein the instructions, when executed by the computer system, operate upon the ASM in a normalized form.

20. The apparatus of claim 17 wherein the instructions, when executed by the computer system, result in:
performing at least one actions of the ASM on the first state to generate at least one state transitions to at least one other ASM states;
generating at least one other encodings, each other encoding corresponding to one of the at least one other ASM states; and
when one of the other encodings is not the same as any one of the encodings already associated with a state of the FSM, including data representing the one of the other encodings and the corresponding state in the data structure representing the FSM.

21. The apparatus of claim 17 wherein the instructions, when executed by the computer system, result in:
concluding generation of the data structure when each of the at least one other encodings is the same as any one of the encodings already associated with a state of the FSM.

22. An article comprising:
a processor; and
a machine-readable medium comprising instructions to generate a data structure representing a finite state machine (FSM) in a computer memory, the instructions, when executed by a computer system comprising the processor, resulting in:
selecting an initial state of an abstract state machine (ASM);
generating a first encoding comprising a plurality of bits to represent the initial state, each bit of the first encoding representing a result of an evaluation of a nontrivial guard condition of the ASM;
associating the initial state with the first encoding in the data structure for the FSM;
identifying at least one other states of the ASM that result from applying at least one actions of the ASM to the initial state;
generating at least one other encodings, each of the at least one other encodings corresponding to one of the at least one other states; and
for each one of the at least one other states, including data in the data structure associating the one of the at least one other states and a corresponding of the at least one other encodings when the corresponding of the at least one other encodings is not the same as the any one encoding already associated with a state in the data structure.

23. The apparatus of claim 22 wherein the instructions, when executed by the computer system, result in:
including in the data structure data representing an action that results in a transition from the first state to one of the at least one other states.

\* \* \* \* \*

UNITED STATES PATENT AND TRADEMARK OFFICE
CERTIFICATE OF CORRECTION

| | | |
|---|---|---|
| PATENT NO. | : 7,088,864 B2 | Page 1 of 1 |
| APPLICATION NO. | : 10/071524 | |
| DATED | : August 8, 2006 | |
| INVENTOR(S) | : Wolfgang Grieskamp et al. | |

It is certified that error appears in the above-identified patent and that said Letters Patent is hereby corrected as shown below:

In column 1, line 14, delete "taken" and insert -- take --, therefor.

In column 1, line 18, after "settings" delete ",".

In column 3, line 21, delete "combination" and insert -- combinations --, therefor.

In column 8, line 37, in Claim 17, delete "medium" and insert -- machine --, therefor.

In column 9, line 10, in Claim 22, delete "article" and insert -- apparatus --, therefor.

Signed and Sealed this

Twentieth Day of July, 2010

David J. Kappos
*Director of the United States Patent and Trademark Office*